United States Patent [19]
Eskeli

[11] 3,748,054
[45] July 24, 1973

[54] REACTION TURBINE

[76] Inventor: Michael Eskeli, 6220 Orchid Ln., Dallas, Tex. 75230

[22] Filed: Nov. 1, 1971

[21] Appl. No.: 194,205

[52] U.S. Cl. ............................................. 415/80
[51] Int. Cl. .................................... F01d 1/18
[58] Field of Search ................................... 415/80

[56] References Cited
UNITED STATES PATENTS

| 709,242 | 9/1912 | Prescott et al. | 415/80 |
| 1,250,663 | 12/1917 | Rohmer | 415/80 |
| 2,596,276 | 5/1952 | Napoli | 415/80 |
| 735,339 | 8/1903 | Brooks | 415/80 |

FOREIGN PATENTS OR APPLICATIONS

| 603,487 | 4/1960 | Italy | 415/80 |

*Primary Examiner*—C. J. Husar
*Attorney*—Wofford, Felsman & Fails

[57] ABSTRACT

A method and apparatus for generating power in response of a fluid flowing from a higher pressure to a lower pressure through a reaction turbine. Said fluid enters said turbine rotor wheel near the center, is then pressurized within said rotor wheel and then discharged via exit nozzles mounted on said wheel in a backward direction; said fluid discharge generating a torque on said wheel, said torque then being passed to the rotor shaft as the useful work output of said turbine. Fluids used may either gaseous, liquids or mixtures of the two.

7 Claims, 3 Drawing Figures

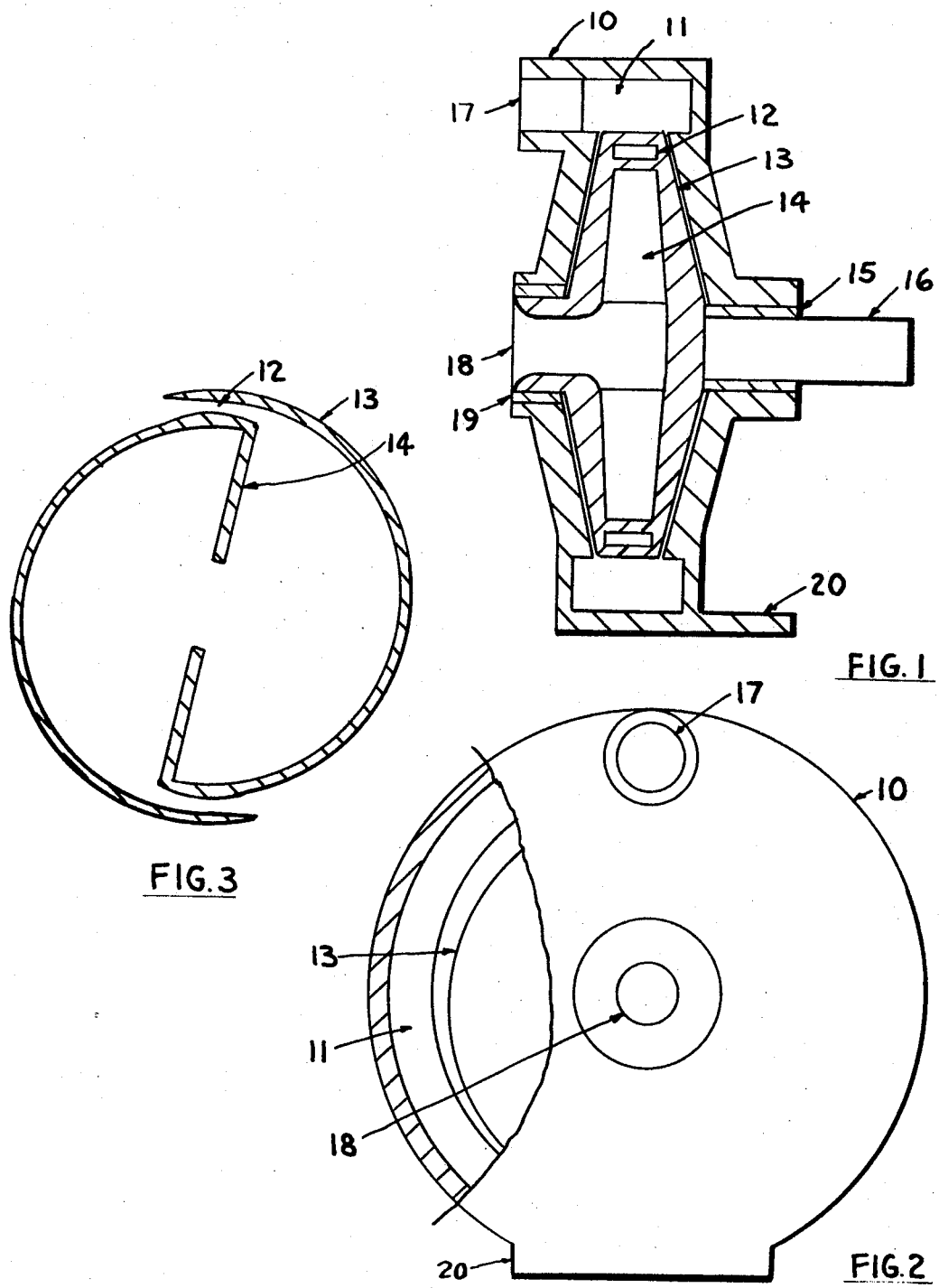

REACTION TURBINE

This invention relates generally to power generation devices, and more particularly to turbines employing a fluid reaction on the turbine rotor wheel as the power generating means.

The art of generating power has seen a variety of devices. Reaction turbines have been built with the pressurized fluid being supplied to the rotor inlet and then discharged to a lower pressure via reaction nozzles mounted on a suitable rotating member and discharging said fluid backwards; with said fluid being passed to said nozzles via radial passages so that said fluid is accelerated in said passages with accompanying pressure drop in addition to velocity gain due to centrifugal force.

The main disadvantage of these conventional devices is that they are inefficient due to relatively low fluid exit velocities from said exit nozzles.

FIG. 1 is a cross section of the turbine, and FIG. 2 is an end view of the same unit with a section removed to show interior.

FIG. 3 is a cross section of the rotor wheel showing vanes and nozzles.

It is an object of this invention to provide an improved reaction turbine power generation means wherein the pressurized entry fluid to said turbine is further pressurized within said turbine wheel before being discharged from said wheel via reaction nozzles mounted on said wheel near its periphery and discharging backward, in a direction away from the direction of rotation.

Referring to FIG. 1, therein is illustrated a reaction turbine. 10 is casing, 11 is space around rotor for collecting discharged fluid, 12 is rotor discharge fluid passage, 13 is rotor, 14 is rotor internal vane, 15 is shaft bearing and seal, 16 is rotor shaft, 17 is fluid discharge opening, 18 is fluid inlet to rotor wheel, 19 is bearing and seal and 20 is unit base.

In FIG. 2, an end view of the turbine is shown. 10 is casing, 17 is fluid discharge opening, 13 is rotor, 11 is fluid space, 18 is fluid inlet, 20 is unit base.

In FIG. 3, a cross section of the rotor is shown. 13 is the rotor, 12 is fluid exit nozzle, 14 is rotor internal vane.

In operation, fluid enters said turbine via inlet 18, and is passed to the interior of the rotating rotor. The fluid is pressurized within said rotating rotor by centrifugal action on said fluid by said rotor, with vanes 14 assuring that said fluid will rotate with said rotor. The pressurized fluid is then passed via said exit nozzles to a lower pressure of the discharge; said fluid when passing through said exit nozzles will generate torque on said rotor wheel; said torque is then passed to said rotor shaft and from there as the useful work output of said turbine.

Said fluid exit nozzles are sized and shaped to provide for highest attainable fluid velocity from said nozzles. Said nozzles may be either converging or converging-diverging type as required for the fluid being used.

The unit casing may be fitted closely to the side walls of the rotor wheel as indicated in FIG. 1; this will allow the rotor wheel to partially evacuate the space between the rotating rotor and the casing thereby reducing losses due to fluid friction.

Fluids being used to drive this reaction turbine may be either liquid, gaseous or gases containing liquids in various proportions. Also, by suitably shaping said exit nozzles, a fluid that is liquid within said rotor and changes to liquid-gas mixture while passing said nozzles, may be used. Efficiencies that are particularly good may be obtained with gaseous fluids that have a high specific heat value at constant pressure, such as hydrogen, methane or ammonia.

The rotor wheel may have one or more exit nozzles, as desired. Further, more than one unit may be employed with a single fluid stream with the fluid being reduced in pressure in one unit, and then passed to the next unit where the pressure is reduced further; this may be necessary to limit rotor speeds when using high pressure fluids.

In FIG. 1, one fluid entry 18, is shown. The rotor wheel may be provided with entry ports on both sides if desired.

What is claimed is:

1. A device for generating power responsive to flow of fluid therethrough comprising:
   a. a power shaft journalled for rotation in a suitable support for transmission of power;
   b. a rotating compressing centrifuge rotor carried on said shaft for generating said power; said compressing centrifuge rotor including:
      i. an inlet port disposed adjacent the center of said compressing centrifuge rotor for entrance of a fluid thereinto;
      ii. a plurality of interior vanes defining passageways therebetween; said passageways diverging as they traverse radially outwardly of said rotor and communicating with said inlet port and having at any radius a first, large cross sectional area and having disposed at the peripheral portion thereof respective obstructions to the flow of fluid to ensure that said fluid flowed into said compressing centrifuge rotor is moved outwardly at a low radial velocity component and attains the same rotational speed as said compressing centrifuge rotor so as to be subjected to a centrifugal force field sufficient to elevate its pressure to form a high pressure fluid at the peripheral portion of said centrifuge rotor;
      iii. a plurality of reaction nozzles disposed at the radially outermost portion of said passageways with at least one reaction nozzle communicating with each said passageway; each said reaction nozzle having a second cross sectional area less than said first cross sectional area of its said passageway to ensure that said fluid is compressed by compressing centrifuge action at the operational high rotational speeds of said compressing centrifuge rotor; said reaction nozzles being disposed tangentially of said compressing centrifuge rotor and in a direction opposite the direction of rotation of said rotor so as to direct the effluent fluid tangentially of said compressing centrifuge rotor for developing torque and power that is proportional to a reaction force to the force effecting the velocity difference between the tangential velocity of the effluent fluid and the tangential velocity of said reaction nozzles and, consequently, said compressing centrifuge rotor; said rotor having heavy duty construction sufficient to withstand high rotational speeds;
   c. a casing sealingly surrounding said compressing centrifuge rotor; said casing defining a passageway surrounding said compressing centrifuge rotor for collection of said effluent fluid; and having respective inlet and outlet passageways; and d. bearing means and seal means disposed intermediate and sealingly engaging said shaft and said casing.

2. The device of claim 1 wherein said casing closely and conformingly receives the ends of said centrifuge rotor such that the high rotational speed of said compressing centrifuge rotor partially evacuates the space between said ends and said casing and effects a reduced friction at operational high rotational speeds.

3. The device of claim 1 wherein said reaction nozzles are at least converging and are sized and shaped to provide for the highest attainable exit velocity of said effluent fluid from said reaction nozzles.

4. The device of claim 3 wherein said reaction nozzles are converging-diverging for effecting isentropic expansion of said effluent fluid.

5. The device of claim 1 wherein said fluid is a gas having a high specific heat value at constant pressure, and is being flowed through said device.

6. A method of generating power in response to flow of a fluid through a device wherein a power delivery shaft is connected with a centrifuge rotor comprising the steps of:

a. flowing said fluid into said centrifuge rotor and while within the confines of said rotor subjecting said fluid to a centrifugal force field via compressing centrifuge action with low radial velocity component to effect a high pressure fluid at the peripheral portion of said rotor; and b. passing said high pressure fluid out of reaction nozzles that are oriented tangentially and rearwardly from the direction of rotation of the periphery of said compressing centrifuge rotor to provide a tangential reaction force to the periphery of said rotor such that a reaction force to said fluid being passed out of said reaction nozzles is imparted to said rotor to deliver power to said shaft.

7. The method of claim 6 wherein said high pressure fluid is expanded isentropically as it is flowed out of said reaction nozzles for a greater velocity and greater reaction force.

* * * * *